(12) United States Patent
Tasker (10) Patent No.: US 8,761,132 B2
(45) Date of Patent: Jun. 24, 2014

(54) ENHANCED WIRELESS VOICE SERVICES USING A SIGNALING PROTOCOL

(75) Inventor: Michael Edric Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 610 days.

(21) Appl. No.: 11/555,213

(22) Filed: Oct. 31, 2006

(65) Prior Publication Data

US 2008/0101298 A1 May 1, 2008

(51) Int. Cl.
*H04W 4/00* (2009.01)

(52) U.S. Cl.
USPC ........... 370/338; 370/352; 370/356; 370/328; 370/329

(58) Field of Classification Search
USPC ................................................. 370/351–356
See application file for complete search history.

(56) References Cited

U.S. PATENT DOCUMENTS

| | | | |
|---|---|---|---|
| 2002/0031212 A1* | 3/2002 | O'Neil et al. ............ | 379/211.02 |
| 2002/0165969 A1 | 11/2002 | Gallant | |
| 2003/0139180 A1 | 7/2003 | McIntosh et al. | |
| 2004/0037259 A1 | 2/2004 | Steinberg | |
| 2005/0048967 A1* | 3/2005 | Hoglander et al. ........ | 455/426.1 |
| 2005/0148362 A1* | 7/2005 | Jagadeesan et al. .......... | 455/555 |
| 2005/0190747 A1* | 9/2005 | Sindhwani et al. ........... | 370/352 |
| 2006/0045069 A1 | 3/2006 | Zehavi et al. | |
| 2006/0089169 A1 | 4/2006 | Tsao et al. | |
| 2006/0126604 A1 | 6/2006 | Kim | |
| 2006/0198310 A1 | 9/2006 | Stieglitz et al. | |
| 2006/0198365 A1 | 9/2006 | Holur et al. | |
| 2006/0205436 A1* | 9/2006 | Liu et al. ....................... | 455/560 |
| 2006/0227948 A1 | 10/2006 | Pearson et al. | |
| 2006/0229101 A1 | 10/2006 | LaBauve et al. | |
| 2007/0032265 A1* | 2/2007 | Park .......................... | 455/552.1 |
| 2009/0213808 A1 | 8/2009 | Boehm et al. | |

FOREIGN PATENT DOCUMENTS

DE      10 2005 015 111 A1    10/2006

OTHER PUBLICATIONS

International Searching Authority USPTO; International Search Report; May 16, 2008; 9 pages.
International Searching Authority USPTO; International Search Report; May 16, 2008; 2 pages.
Extended European Search Report in counterpart European application No. 07871238.7, mailed Aug. 8, 2013, 7 pages.
Jaseemuddin, "An Architecture for Integrating UMTS and 802.11 WLAN Networks," Proceedings of the Eighth IEEE International Symposium on Computers and Communication (ISCC'03), Jun. 30-Jul. 3, 2003, 8 pages.

* cited by examiner

*Primary Examiner* — Ajit Patel (57) ABSTRACT

We describe an example system including a wireless cellular channel to transmit voice data associated with a call between a server and a wireless device. A wireless signaling channel, distinct from the wireless cellular channel, transmits supplementary signaling packets between the server and the wireless device.

19 Claims, 5 Drawing Sheets

ENHANCED WIRELESS VOICE SERVICES USING A SIGNALING PROTOCOL

TECHNICAL FIELD

The present disclosure relates generally to enhanced wireless voice services using a signaling protocol.

BACKGROUND

Wireless local area networks (WLANs) enable users to access public, private, or enterprise wireless networks through wireless devices, like laptop computers. WLANs provide high-rate wireless data access in a relatively small area using a variety of wireless access protocols including the Institute for Electrical and Electronics Engineers (IEEE) 802.11 protocol. Voice over wireless local area networks (VoWLANs) build on WLANs by allowing voice enabled wireless devices like cellular phones to deliver packetized voice data over WLANs. This technology is often called Vo Wi-Fi or Wi-Fi VoIP because it uses the IEEE 802.11 protocol for wirelessly transporting voice over the WLAN and the Internet. The IEEE 802.11 protocol is, however, designed to support packetized data communication within a limited area. Voice enabled wireless devices using only the IEEE 802.11 protocol to transport voice packets are thus operable in only that limited area. And voice quality often suffers because the IEEE 802.11 protocol is optimized for wireless data communication and not voice.

Vendors of voice enabled wireless devices are currently making dual mode voice enabled wireless devices that include both the IEEE 802.11 protocol wireless capabilities in addition to standard cell phone technology. These dual mode wireless devices operate in both VoWLANs using the IEEE 802.11 protocol and in standard cellular networks.

DESCRIPTION OF EXAMPLE EMBODIMENTS

Overview

We describe an example system that comprises a wireless cellular channel to transmit voice data associated with a call between a server and a wireless device. A wireless signaling channel, distinct from the wireless cellular channel, transmits supplementary signaling packets between the server and the wireless device.

We describe an example method that comprises transmitting voice data associated with a call between a server and a wireless device using a wireless cellular channel and transmitting supplementary signaling packets between the server and the wireless device using a wireless signaling channel distinct from the wireless cellular channel.

And we describe an example wireless device configured to transmit voice data associated with a call using a wireless cellular channel and to transmit supplementary signaling packets associated with the call using a wireless network signaling channel, distinct from the wireless cellular channel.

Description

We describe examples of enhanced wireless voice services using a signaling protocol with reference to the accompanying drawings. Various other examples are possible and practical and are not limited to the examples we describe below.

In the figures, the size of the boxes does not represent size of the various physical components. Where the same element appears in multiple figures, we use the same reference numeral to denote the element in all of the figures where it appears. When two elements operate differently, we use different reference numerals regardless of whether the two elements are the same class of network device.

Figure 1:
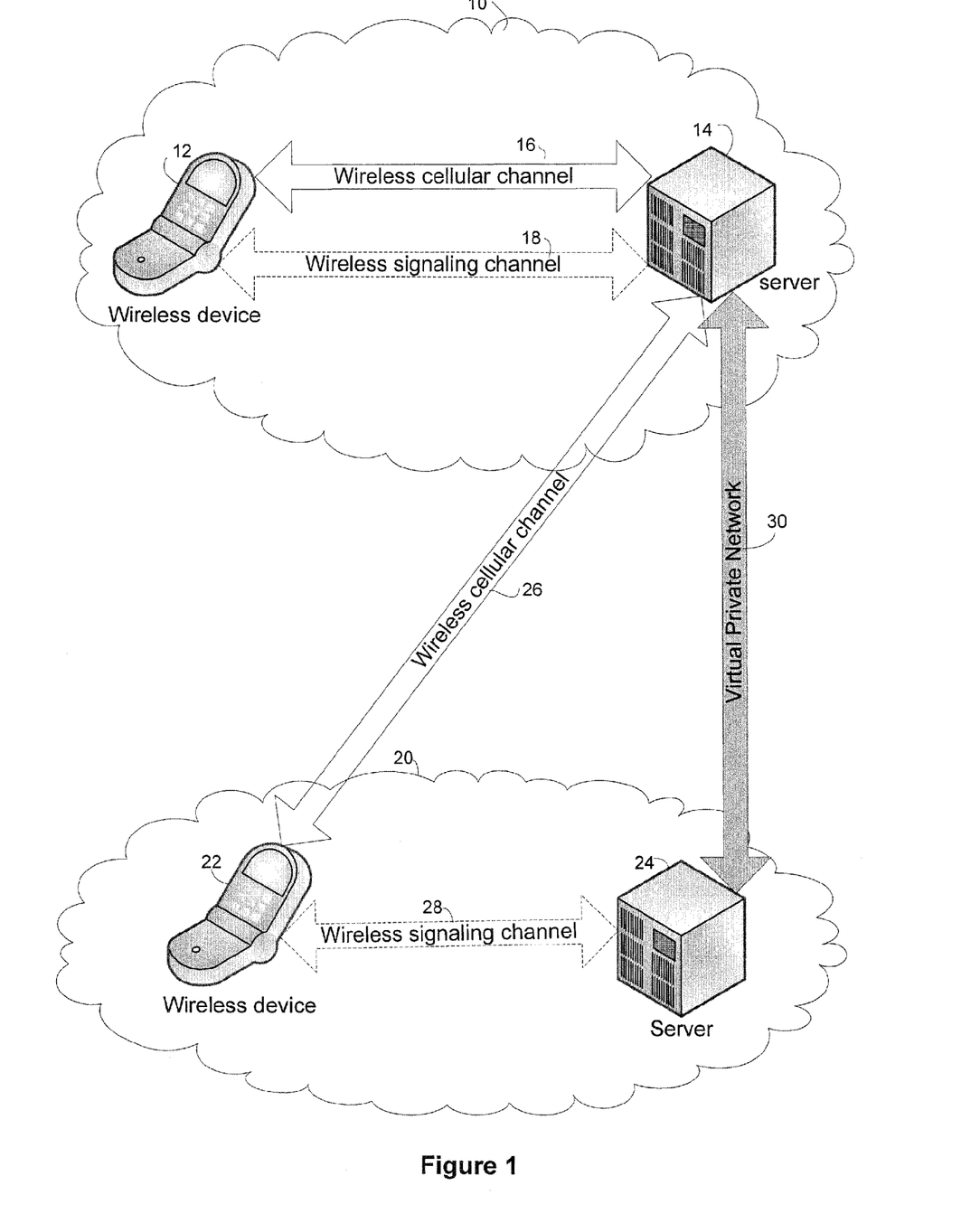
FIG. 1 illustrates an example wireless communication network with enhanced wireless voice services using a wireless signaling protocol.

FIG. 1 illustrates an example wireless communication network with enhanced wireless voice services using a wireless signaling protocol. Referring to FIG. 1, a wireless network 10 may include a wireless device 12 and a server 14. In an embodiment, the wireless network 10 may be a wireless internet protocol (IP) network, e.g., a WLAN.

The wireless network 10 may use any known communication protocols to provide data grade coverage. These communication protocols may include wireless communication protocols like the IEEE 802.11. The network 10 may be an enterprise network deployed across an enterprise campus. The network 10 may also be a public hot stop network, e.g., those often found in modern coffee shops. And the network 10 may be a user's home or private 802.11 network. It should be apparent to those of skill in the art that the network 10 is not limited to any particular communication protocol.

In an embodiment, the server 14 may be a VoIP private branch exchange (VoIP PBX). The VoIP PBX 14 is a switching system that manages calls between internal or local users, e.g., wireless device 12, within an enterprise. The VoIP PBX 14 shares a number of lines (not shown) that connect to the external, public switched telephone network (PSTN) and parcels them out as needed to the internal users, e.g., wireless device 12. In VoIP or IP telephony systems, the VoIP PBX 14 performs all the switching and connecting of regular and VoIP calls. The VoIP PBX 14 may allow for the convergence of voice and data into a single network 10.

The server 14 may also be a public hot spot network server or a user's home or private 802.11 network server.

The wireless device 12 may be any type of device capable of communicating wirelessly with the server 14. In an embodiment, the wireless device 12 is a voice enabled wireless device, e.g., a cellular phone. The wireless device 12 communicates with the server 14 using a wireless cellular channel 16 and a wireless signaling channel 18. The wireless signaling channel 18 may be distinct and independent of the wireless cellular channel 16. The wireless cellular channel 16 may be used to transmit voice data associated with a call between the wireless device 12 and the server 14. The wireless channel 16 may also be used to transmit signaling data associated with the call. The wireless cellular channel 16 may be an analog or digital channel, and may use a variety of wireless communication protocols known to those skilled in the art, e.g., global system for mobile (GSM) communication, code division multiple access (CDMA), time division multiple access (TDMA), and the like.

The wireless device 12 communicates supplementary signaling data to the server 14 over the signaling channel 18. The signaling data may be packetized or otherwise encapsulated and may include a destination address in addition to data. The supplementary signaling data may provide enhanced call services to the wireless device 12. The wireless signaling channel 18 may use any wireless communication protocol associated with the network 10 including the IEEE 802.11 protocol.

A second wireless network 20 includes a second wireless device 22 in communication with a second server 24 using a wireless signaling channel 28. Like the server 14, the second server 24 may be an enterprise server, VoIP PBX, switch, public hot spot server, private 802.11 server, and the like. The second server 24 communicates supplementary signaling data with the wireless device 22 over the wireless signaling channel 28. The wireless signaling channel 28 may use any wireless communication protocol associated with the network 20 including the IEEE 802.11 protocol. The second wireless device 22 may also communicate voice and signaling data associated with a call between it and the server 14 using a wireless cellular channel 26. The wireless cellular channel 26 may be an analog or digital channel, and may use a variety of wireless communication protocols known to those skilled in the art, e.g., global system for mobile (GSM) communication, code division multiple access (CDMA), time division multiple access (TDMA), and the like.

The second wireless device 22 may initiate a virtual private network (VPN) connection 30 between the server 14 and the second server 24. The VPN connection 30 may transmit packetized supplementary signaling data between the second wireless device 22 and the server 14 through the second server 24.

Figure 2:
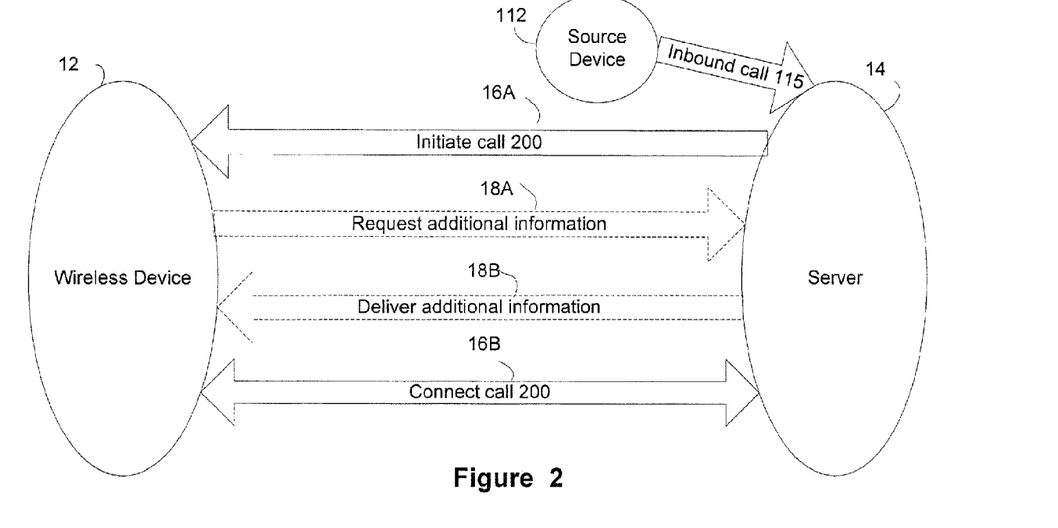
FIG. 2 illustrates an example wireless communication network with enhanced wireless voice services using a wireless signaling protocol to achieve additional call information.

In FIGS. 1, 2, 4, 6, and 8, the wireless cellular channels 16 and 26 use solid lines while the wireless signaling channels 18 and 28 use broken lines. In FIG. 2, the signaling channel 18 shown in FIG. 1 is referenced with 18A when the signal flows from the device 12 to the server 14 and as 18B when the signal flows from the server 14 to the device 12. Likewise, the wireless cellular channel 16 shown in FIG. 1 is referenced with 16A when the signal flows from the server 14 to the device 12 during, e.g., call establishment, and 16B after the server 14 connects the call 115 to the device 12.

FIG. 2 illustrates an example wireless communication network with enhanced wireless voice services using a wireless signaling protocol to achieve additional call information. Referring to FIGS. 1 and 2, the wireless cellular channel 16 (16A and 16B in FIG. 2) may communicate voice and signaling data associated with a call between the server 14 and the device 12. The signaling channel 18 (18A and 183B in FIG. 2) may communicate supplementary signaling data between the server 14 and the device 12 using, e.g., the IEEE 802.11 protocol. Alternatively, a second signaling channel 28 may communicate supplementary signaling data between the devices 12 and 22 and the servers 14 and 24 through the VPN connection 30.

The server 14 receives an inbound call 115 from a source device 112. If the server 14 is a VOIP PBX, the inbound call may be an internal call from any one of the internal lines of the exchange or may be an external call through a PSTN. The inbound call 115 may include a caller identification number, i.e., a unique number or code assigned to the source device 112 encoded in the call 115 capable of being decoded by the device 12 or server 14. We refer to the call 115 as an anchored call in that it is anchored or moored at the server 14. And the device 12 may use the caller identification to invoke any additional service for that call later.

The server 14 initiates the call 200 with the wireless device 12 using the wireless cellular channel 16A. The wireless device 12 identifies the call 200 as coming from the server 14 using the server 14's caller identification, a number assigned particularly to the server 14. During the establishment and prior to forwarding voice data associated with the call 200, the device 12 may request supplemental or additional information about the call 200 from the server 14 using the wireless signaling channel 18A. The request may be in the form of a variety of protocol known to those skilled in the art, e.g., an HTTP protocol. The request may be made over the signaling channel 18 using a variety of well known wireless signaling protocols including the IEEE 802.11. The server 14 receives the request and may assign it a request number that correlates it with the wireless device 12, current time, caller identification number, or any other information associated with the call 200.

If the server 14 correlates the request from the device 12 to the call 115 from the source device 112 and/or to the call 200 from the server 14, it delivers the supplemental or additional information to the wireless device 12 using the signaling channel 18B. The supplemental or additional information may include the caller identification of the source device 112 as well as any other information sought by the device 12 from the server 14 in the request associated with the call 200, e.g., status of the caller's account, information about current order, status for the caller, and the like.

The wireless device 12 may display some of the supplemental information in a display. Or the device 12 may process some of the supplemental information for other purposes. Once the call 200 is established, the wireless device 12 may alert a user of the incoming call 200 so that he may answer it.

Figure 3:
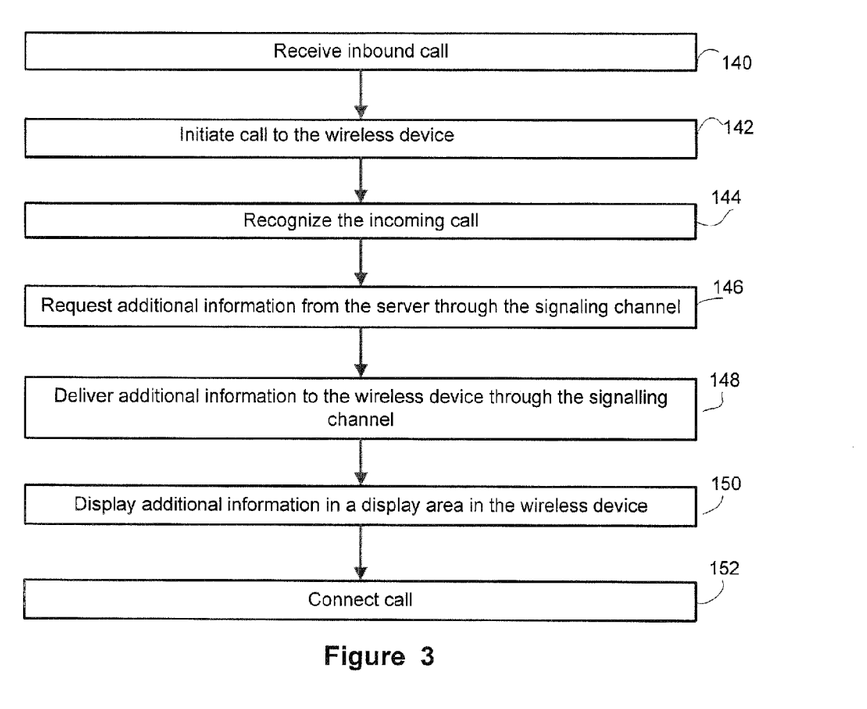
FIG. 3 illustrates an example flow chart of a wireless communication method associated with the networks shown in FIGS. 1 and 2.

FIG. 3 illustrates an example flow chart of a wireless communication method associated with the networks shown in FIGS. 1 and 2. Referring to FIG. 3, a server 14 receives an inbound call 115 at 140. The server 14 initiates a call 200 with the wireless device 12 in 142 using the wireless cellular channel 16 (16A in FIG. 2). At 144, the wireless device 12 may identify the call 200 as coming from the server 14 because it may include the server 14's caller identification, a number assigned particularly to the server 14. The wireless device 12 may treat the call 200 as anchored at the server 14 responsive to identifying the server 14's caller identification. At 146, during the establishment and prior to forwarding voice data associated with the call 200, the device 12 may request supplemental or additional information about the call from the server 14 using the wireless signaling channel 18 (18A in FIG. 2) with a wireless communication protocol such as the IEEE 802.11. The server 14, in turn, may use the device 12's caller identification to correlate the request for information to the wireless device 12, current time, or the like. The server 14 may optionally correlate the request with the anchored call 115 and/or call 200.

At 148, the server 14 delivers supplemental or additional information, responsive to the request, using the signaling channel 18 (18B in FIG. 2). The supplemental information may include the caller identification number of the source device 112, other information about the source device 112, information about the status of the source device 112's account, information about current order status for the source device 112, and the like. The supplemental or additional information may also include a unique call identification that the wireless device 12 may use to specifically identify the call 200 should the wireless device 12 user need to invoke additional services for that call at a later time.

At 150, the wireless device 12 may display some or all of the supplemental information in a display area and alert the user to the incoming call 200. If the user answers, the server 14 connects the call 200 from the source device 112 to the wireless device 12 through the server 14 using the wireless channel 16 (16B in FIG. 2) at 152.

Figure 4:
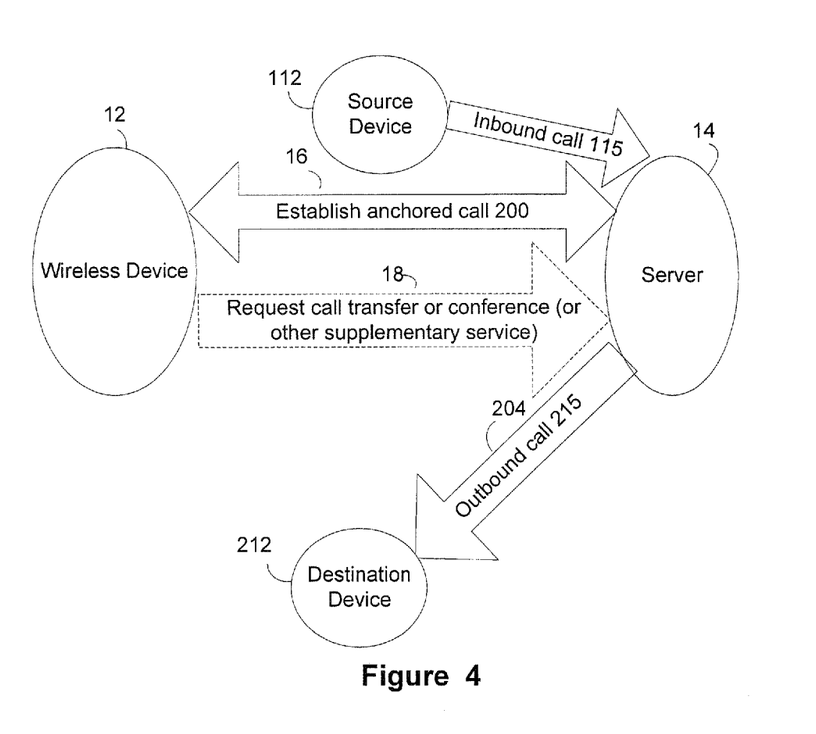
FIG. 4 illustrates an example wireless communication network with enhanced wireless voice services using a wireless signaling protocol to achieve supplementary service.

FIG. 4 illustrates an example wireless communication network with enhanced wireless voice services using a wireless signaling protocol to achieve supplementary service. As with the network shown in FIGS. 1 and 2, the server 14 communicates with the device 12 using cellular channel 16 and signaling channel 18. Referring to FIG. 4, the server 14 receives and anchors the incoming call 115 from the source device 112. The server 14 establishes the anchored call 200 between the source device 112 and the wireless device 12. In another embodiment, the user of the wireless device 12 may also initiate the anchored call 200.

During the anchored call 200, the wireless device 12's user may desire a supplementary service that often requires connecting the call 200 to another device, e.g., a destination device 212. The supplementary services may include transferring the call 200 to the destination device 212 or conferencing the destination device 212 into the call 200 between the wireless device 12 and the source device 112. Supplementary services refers to any service that is supplementary or additional to the call 200. If the server 14 is a VOIP PBX, the destination device 212 may be internal or external to the exchange, the external device requiring an external connection and line 204, e.g., a PSTN line.

The wireless device user may initiate a request for supplementary service by pressing a feature button on the wireless device 12 or by using a voice command when the wireless device 12 includes that functionality. Alternatively, the user may initiate the request for supplementary service using any known means. The wireless device 12 requests supplementary service from the server 14 using the signaling channel 18 and a wireless signaling protocol such as the IEEE 802.11. The server 14 may place an outbound call 215 to the destination device 212 responsive to the request by calling an internal number using internal lines or by calling an external number using external lines through, e.g., a PSTN line. The server 14 may determine to use internal or external lines depending on the destination device 212. Where a wireless communication network includes only a few analog PSTN lines, supplementary service may include hook-flash such that a flash signal can be tunneled through to the PSTN line to activate standard class-5 services such as call waiting and 3-way calling.

Figure 5:
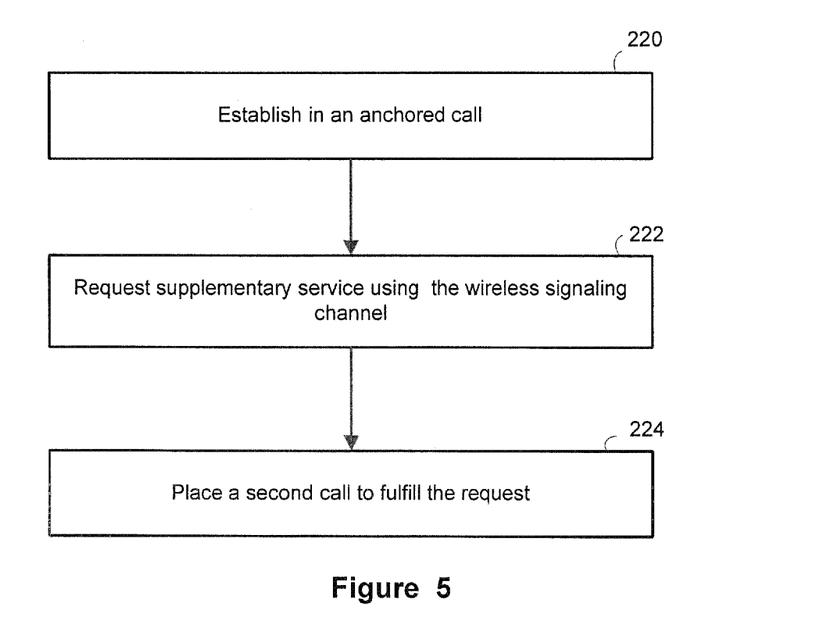
FIG. 5 illustrates an example flow chart of a wireless communication method associated with the network shown in FIG. 4.

FIG. 5 illustrates an example flow chart of a wireless communication method associated with the network shown in FIG. 4. Referring to FIG. 5, at 220, the server 14 and the wireless device 12 establish an anchored call 200 as explained in more detail above. At 222, the user of the wireless device 12 may request supplementary services, e.g., call transfer or conferencing, from the server 114 using the signaling channel 18. The user may initiate the request by a variety of means, including pressing a feature button on the wireless device 12, giving a voice command, and the like. At 224, the server 14 fulfills the request by placing an outbound call 215 to the destination 212 using internal or external lines depending on the particular destination device 212's number.

Figure 6:
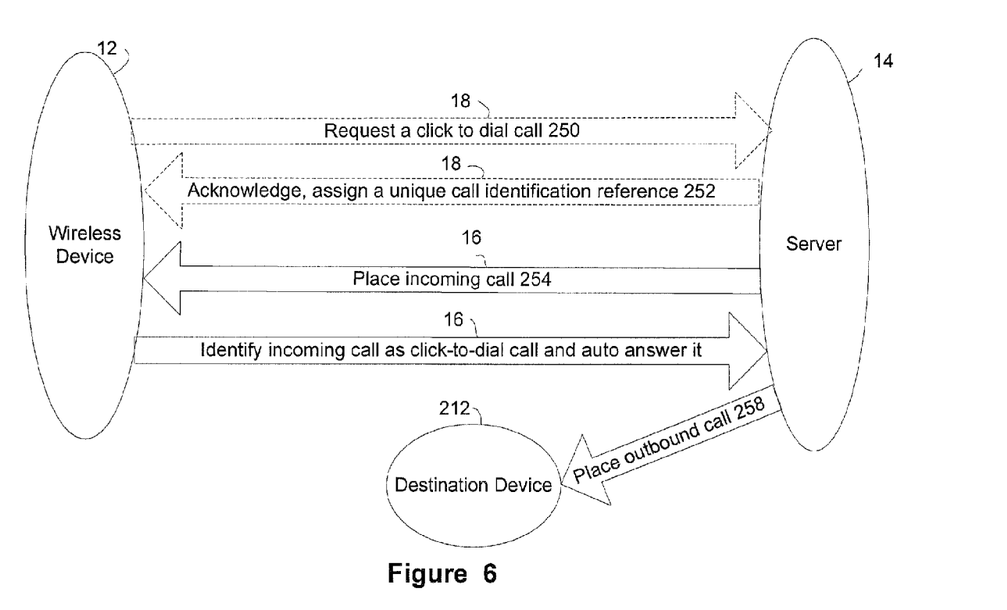
FIG. 6 illustrates an example of wireless communication network with enhanced wireless voice services using a wireless signaling protocol to achieve a click to dial call.

FIG. 6 illustrates an example of wireless communication network with enhanced wireless voice services using a wireless signaling protocol to achieve a click-to-dial call 250. The user of the wireless device 12 initiates a click to dial call when he wants to make an outbound call through the server 14 to a destination device 212. Where the server 14 is a VoIP PBX, the destination device 212, and its particular number, may be internal or external to the exchange.

Referring to FIG. 6, the wireless device 12, or more precisely the user of the device 12, requests a click-to-dial call 250 from the server 14 using the signaling channel 18 and a wireless signaling protocol such as the IEEE 802.11. The request may be responsive to the user initiating a click-to-dial call 250 by selecting a phone number or contact for the destination device 212 from the device 12's address book. Or the user may select a number for the destination device 212 from a central directory lookup or database in the server 14 or the networks 10 or 20.

The server 14 transmits an acknowledgement 252 of the call 250 via the wireless signaling channel 18 using a wireless communication protocol such as the IEEE 802.11. The server 14 may also assign a unique call identification reference for the call 250. The server 14 places an incoming call 254 to the wireless device 12 using the wireless cellular channel 16. By doing so, the device 12 does not make a direct outbound call to the destination device 212 avoiding or diminishing attendant time and money charges. Instead, the server 14 places an incoming call 254 to the device 12 using the cellular channel 16 responsive to the click-to-dial call request.

The wireless device 12 may identify and automatically answer the incoming call 254 from the server 14. The wireless device 12 may identify the incoming call 254 using a variety of methods. The wireless device 12 may identify the incoming call 254 by its timing, and more precisely by the timing of the call 254 relative to the timing of the request for a click-to-dial call 250. Or the wireless device 12 may identify incoming call 254 by using the enhanced call information mechanism described relative to FIGS. 1-3. The wireless device 12 may also identify the incoming call 254 by decoding the unique identification reference assigned by the server 12 and included in the acknowledgement 252. If the server 14 uses an external line (e.g., PSTN line) to complete the click-to-dial call 250, it may use the last few digits of the PSTN line as an identification number for the incoming call 254. This assumes that the server 14 has a fixed number of PSTN numbers it reserves for the click-to-dial service.

The server 14 places the outbound call 258 to the destination device 212 responsive to the wireless device identifying the incoming call as the click-to-dial call 250.

In an embodiment, the server 14 may simultaneously place a call to the wireless device 12 and the destination device 212 responsive to the click-to-dial call 250. Or the server 14 may call the destination device 212 before calling the wireless device 12. That is, the server 14 may determine the availability of the destination device 212 before connecting the call to the device 12.

Figure 7:
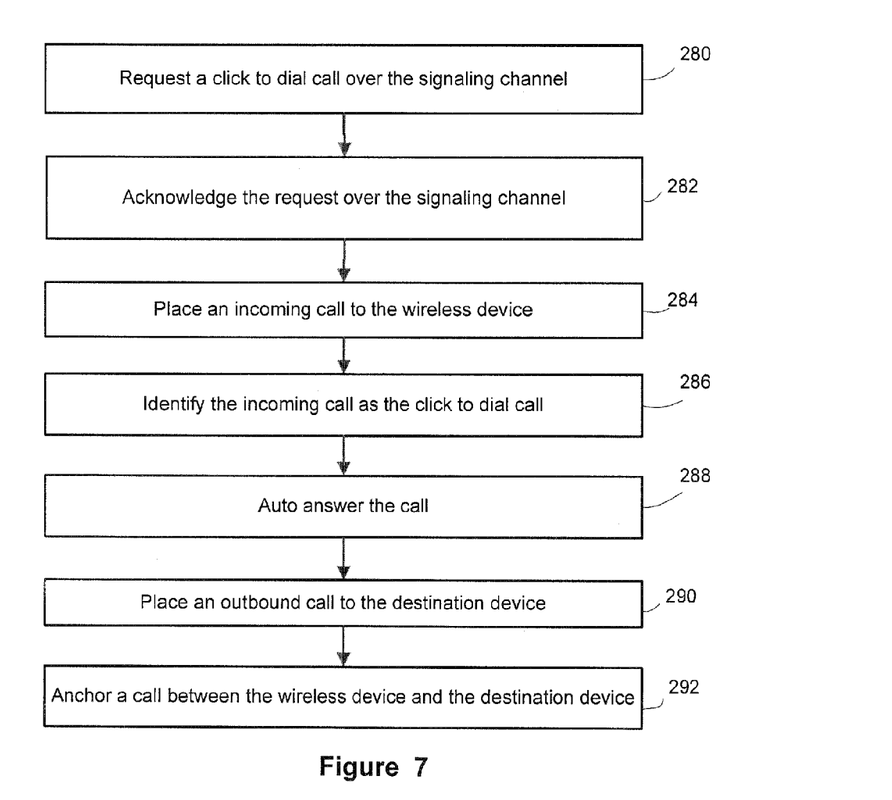
FIG. 7 illustrates an example flow chart of a wireless communication method associated with the network shown in FIG. 6.

FIG. 7 illustrates an example flow chart of a wireless communication method associated with the network shown in FIG. 6. At 280, the wireless device 12, or its user, request a click-to-dial call 250 from the server 14 using the signaling channel 18. At 282, the server 14 transmits an acknowledgement 252 using the wireless signaling channel 18. The server 14 may assign a unique call identification reference to the click-to-dial call 250 and include it with the acknowledgement 252. At 284, the server 14 places an incoming call 254 to the wireless device 12 using the wireless cellular channel 16. The wireless device 12 identifies the incoming call 254 (at 286) using any of a variety of means we explain above and automatically answers it (at 288). At 290 and 292, the server 14 places an outbound call 258 to the destination device 212 anchoring the call between the wireless device 12 and the destination device 212. The sequence described in FIG. 7 may be altered as we explain in more detail above.

Figure 8:
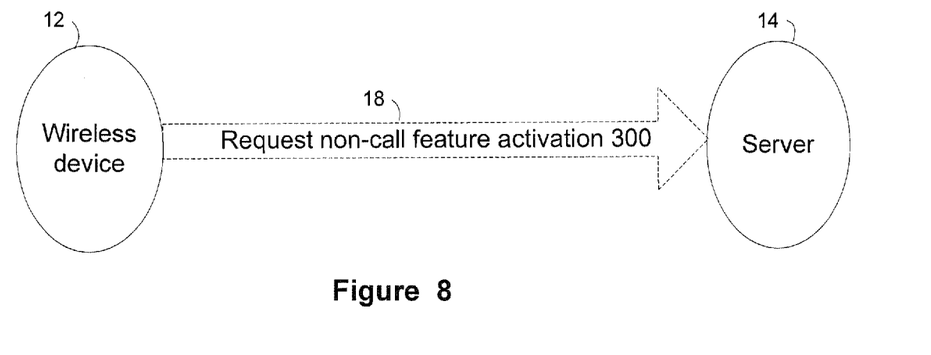
FIG. 8 illustrates an example of wireless communication network with enhanced wireless voice services using a wireless signaling protocol to achieve activation of non-call features.

FIG. 8 illustrates an example of wireless communication network with enhanced wireless voice services using a wireless signaling protocol to achieve activation of non-call features. The user of the wireless device 12 may want to request a variety of non-call features and services. In an embodiment, if the user of the wireless device 12 does not want to be disturbed during a certain time period, the user may request a do-not-disturb service during that time period. This service prevents the server 14 from sending any incoming anchored call to the wireless device 12 during that time period. In another embodiment, the user of the wireless device 12 may request activation of call forward all that forwards all the calls destined for the wireless device 12 to another device. In yet another embodiment, in an enterprise, the user of the device 12 may send a log-in request to indicate his availability at the beginning of a shift or office hour. Similarly, the user of the device 12 may send a log-out request at the end of the shift. Such a request may also be made during a work break or other appropriate time period. It should be apparent to those skilled in the art that the inventive principles of this patent disclosure are not limited to any particular type of non-call feature request.

Referring to FIG. 8, the user of the wireless device 12 may initiate a request 300 for activation of a non-call feature by a variety of means, including pressing a feature button on the wireless device 12 or issuing a voice command to the wireless device 12. The device 12 transmits the request 300 to the server 14 using the signaling channel 18. The server 14 activates the non-call feature responsive to the request 300.

Figure 9:
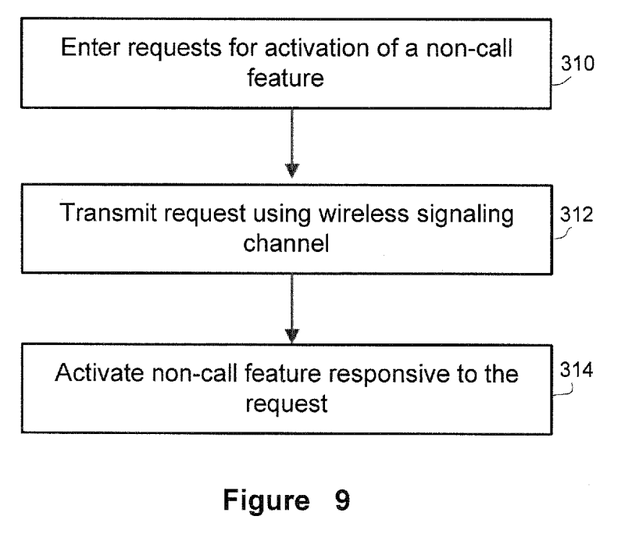
FIG. 9 illustrates an example flow chart of a wireless communication method associated with the network shown in FIG. 8.

FIG. 9 illustrates an example flow chart of a wireless communication method associated with the network shown in FIG. 8. Referring to FIG. 9, a user of the wireless device 12 activates a request 300 for a non-call feature at 310 using any of a variety of means, including pushing a button on the device 12 or issuing a voice command. At 312, the device 12 transmits the request for a non-call feature using the signaling channel 18. At 314, the server 14 activates the non-call feature responsive to the request 300.

We describe the embodiments above prior to the establishment of an active call, but other embodiments may not be so limited.

We describe the embodiments above for wireless call between any endpoints such as personal computers, IP phones, Personal Digital Assistants (PDAs), cell phones, smart phones, PSTN gateways, and the like.

We describe embodiments with reference to the drawings. Various other embodiments are also possible and practical. The embodiments should not be construed as being limited to the examples we set forth above.

The system we describe above can use dedicated processor systems, micro controllers, programmable logic devices, or microprocessors that perform some or all of the operations. Some of the operations described above may be implemented in software and other operations may be implemented in hardware or a combination of both software and hardware.

For the sake of convenience, we have described the operations as various interconnected functional blocks or distinct software modules. This is not necessary, however, and there may be cases where these functional blocks or modules are equivalently aggregated into a single logic device, program, or operation with unclear boundaries. In any event, the functional blocks and software modules or features of the flexible interface can be implemented by themselves, or in combination with other operations in either hardware or software.

I claim all modifications and variation coming within the spirit and scope of the following claims.

I claim the following:

1. A system comprising:
   a wireless device;
   a server configured to:
      receive an inbound call from a source device directed towards the wireless device,
      place a first incoming call with the wireless device using a wireless cellular channel through a cellular network,
      receive, via a wireless signaling channel that is separate from the wireless cellular channel, a request from the wireless device for supplemental identification information about the call,
      provide, to the wireless device, the supplemental identification information about the call including a unique call identification reference that the wireless device may use to specifically identify the call if the wireless device user invokes additional services for the call,
      receive, via the wireless signaling channel, a request from the wireless device for a destination device to provide supplemental call service associated with the call, wherein the request includes the unique call identification reference for use in establishing the supplemental call service,
      in response to the request for supplemental call service, place a second incoming call to the wireless device, and
      if the wireless device identifies the second incoming call, place an outbound call to the destination device.

2. The system of claim 1 wherein to identify the second incoming call, the wireless device is configured to request supplemental information about the second incoming call from the server via the wireless signaling channel.

3. The system of claim 1 where the server is a voice over internet protocol private branch exchange server.

4. The system of claim 1
   wherein the request for supplemental identification information was not prompted by the server, where the server is configured to transmit the supplemental identification information about the anchored call to the wireless device using the wireless signaling channel.

5. The system of claim 1 wherein the wireless device is configured to auto-answer the second incoming call.

6. The system of claim 1 where the server is configured to:
   receive, via the wireless signaling channel, a request from the wireless device for a click to dial call with the destination device;
   transmit an acknowledgement responsive to the request to the wireless device using the wireless signaling channel;
   place a first call to the destination device;
   place a second call to the wireless device through the wireless cellular channel; and
   anchor a call between the wireless device and the destination device.

7. The system of claim 1 where the server is configured to:
   activate a non-call feature responsive to a request transmitted using the wireless signaling channel.

8. A method comprising:
   transmitting voice data associated with a call from a server to a wireless device using a wireless cellular channel through a cellular network;
   receiving, via a wireless signaling channel that is separate from the wireless cellular channel, a request from the wireless device for supplemental identification information about the call;
   transmitting, to the wireless device, the supplemental identification information about the call including a unique call identification reference that the wireless device may use to specifically identify the call if the wireless device user invokes additional services for the call;
   receiving, via the wireless signaling channel, a request at the server from the wireless device for supplemental call service associated with the call, wherein the request includes the unique call identification reference for use in establishing the supplemental call service;
   in response to the request for supplemental call service, placing an incoming call to the wireless device, and
   if the wireless device identifies the incoming call, placing an outbound call to the destination device.

9. The method of claim 8 further comprising:
   requesting, at the wireless device, supplemental information about the incoming call from the server via the wireless signaling channel in order to identify the call.

10. The method of claim 8 comprising:
    anchoring, with the server, a first call between a source device and the wireless device using the wireless cellular channel, where the wireless device is configured to request supplementary services using the wireless signaling channel while the anchored call is in progress over the wireless cellular channel; and
    placing a second call with the server responsive to the request from the wireless device.

11. The method of claim 10 where the request for supplementary services comprises requesting one of a call transfer and a call conference.

12. The method of 8 comprising:
    identifying, at the wireless device, the incoming call by the unique call identification reference; and
    anchoring a call between the wireless device and destination device responsive to the identifying.

13. The method of claim 8 comprising:
    requesting activation of a non-call feature using the wireless signaling channel prior to an establishment of the call, where the non-call feature includes at least one of a do not disturb status, call forward all status, log-in/log-out status, and shift start/end.

14. A method comprising:
    transmitting, from a wireless device, voice data associated with a call to a server using a wireless cellular channel through a cellular network;
    transmitting, by the wireless device via a wireless signaling channel that is separate from the wireless cellular channel, a request to the server for supplemental identification information about the call;
    receiving, via the wireless signaling channel, from the server the supplemental identification information about the call including a unique call identification reference that the wireless device may use to specifically identify the call if the wireless device user invokes additional services for the call;
    transmitting, via the wireless signaling channel, a request to the server for supplemental call service associated with the call, wherein the request includes the unique call identification reference for use in establishing the supplemental call service;
    receiving an incoming call from the server, and
    identifying the incoming call from the server.

15. The method of claim 14 further comprising:
    performing, by a mobile phone using the wireless network signaling channel, at least one of a supplementary service invocation, click-to-dial call service, enhanced call information service, or activation of non-call features service.

16. The method of claim 14 wherein identifying the incoming call from the server comprises:
    requesting supplemental information about the incoming call from the server via the wireless signaling channel.

17. The method of claim 14 further comprising:
    establishing an anchored call using the wireless cellular channel; and
    transmitting at least one supplementary service request using the wireless signaling channel during the establishment of the anchored call.

18. The method of claim 14 further comprising:
    requesting by the wireless device activation of a non-call feature using the wireless signaling channel prior to an establishment of the call, where the non-call feature includes at least one of a do not disturb status, call forward all status, log-in/log-out status, or shift start/end.

19. The method of claim 14 further comprising:
    identifying the incoming call by the unique call identification reference.

* * * * *